3,392,141
STABILIZATION OF POLYOLEFINS
Morris Blumberg, Newark, and Albert S. Matlack, Hockessin, Del., assignors to Hercules Incorporated, a corporation of Delaware
No Drawing. Filed Jan. 3, 1966, Ser. No. 517,970
3 Claims. (Cl. 260—45.7)

ABSTRACT OF THE DISCLOSURE

A water extraction-resistant, oxidation stabilizer system for polyolefins comprises the combination of certain poly(cyclohexylenedisulfides) and a hindered phenol, and more particularly the combination of a poly(dipentenedisulfide) and a tris(dialkylhydroxyphenoxy)-s-triazine, a bis(dialkylhydroxyphenoxy)monothioalkyl - s - triazine, a poly(alkylhydroxyphenyl) substituted hydrocarbon or a bis(alkylhydroxyphenyl)alkanoic acid ester.

---

The present invention relates to polyolefin compositions and, more particularly, to the stabilization of polymers, i.e., hompolymers and copolymers, of ethylene, propylene, and higher mono-α-olefins against oxidative degradation.

High molecular weight polymers of ethylene, propylene, and higher mono-α-olefins are well known and have many established uses. However, one of the deficiencies of such polymers which must be overcome to enable their use in many applications is poor stability during exposure to oxygen, particularly in the presence of heat.

It is known that polyolefins can be stabilized against the adverse effects of heat and oxidation by incorporating in such polymers a small amount of certain phenolic antioxidants. It is also known that certain sulfur-containing compounds, which act as peroxide decomposers, provide protection against oxygen-induced deterioration. Although these phenolic compounds and sulfur compounds provide protection for the polyolefins from degradation due to oxygen and heat, they have not proved entirely satisfactory for many end uses due to the ease with which they are removed from polymers containing them by volatilization or extraction during use.

Now, in accordance with this invention, it has been discovered that the combination of a poly(cyclohexylenedisulfide) of the formula

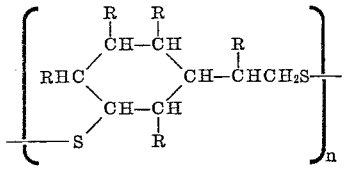

where R is hydrogen or an alkyl radical and n is a number from 5 to 100, and a hindered phenolic compound possesses a significant ability to protect polyolefins against deterioration due to oxygen and heat, and that the protection is retained even after extensive contact with water. This finding was indeed unexpected since the prior art combinations of phenolic compounds and sulfur compounds are ineffective water extraction-resistant oxidation stabilizers for polyolefins.

The invention is particularly useful in stabilizing polyolefins, i.e., homopolymers, copolymers, and terpolymers of ethylene and α-monoolefins having from 3 to 6 carbon atoms, including, for instance, polyethylene, polypropylene, poly(butene-1), poly(pentene-1), poly(3-methylbutene-1), and poly(4-methylpentene-1), copolymers of ethylene and propylene, terpolymers of ethylene, propylene, and a diene such as dicyclopentadiene, and the like.

The poly(cyclohexylenedisulfide) component of the stabilizer combination of the present invention can be any polymer containing from 5 to 100 of the repeating unit

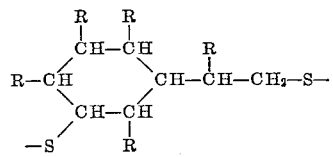

Each R can be alike or different and preferably is hydrogen or an alkyl group containing from 1 to 18 carbon atoms. Preferred poly(cyclohexylenedisulfides) include poly(dipentenedisulfide), i.e., the polydisulfide from 1-(α - methyl - β - mercaptoethyl) - 3 - mercapto - 4 - methylcyclohexane having a molecular weight within the range of about 1,000 to 15,000 (i.e., where n of the formula is 5 to 75), the polydisulfides from 1-β-mercaptoethyl-3-mercapto cyclohexane, 1-mercaptomethyl - 3 - mercaptocyclohexane, 1 - β-mercaptoethyl-4-mercaptocyclohexane, 1-γ-mercaptopropyl-3-mercaptocyclohexane, 1,4-bis(mercaptomethyl)cyclohexane, and the like.

The poly(cyclohexylenedisulfides) can be prepared according to methods known to the art, as, for example, by oxidizing the corresponding dithiol with air according to the method of Marvel and Olson, J. Am. Chem. Soc. 79, 3089 (1957), or with a stoichiometric amount of iodine, bromine, or ferric chloride in the presence of the base and a suitable solvent such as benzene.

The other component of the stabilizer system of the present invention is, as stated above, a hindered phenolic compound. Particularly useful phenolic compounds of this type include the bis(alkylhydroxyphenyl)alkanoic acid esters, poly(alkylhydroxyphenyl) substituted hydrocarbons, including the A-stage para-tertiary alkylphenolformaldehyde resins, poly(alkylhydroxyphenoxy) substituted triazines, alkylphenol-acetylene condensates, thiobis(alkylphenol)s, and polymeric terpene-phenol condensates.

The bis(alkylhydroxyphenyl)alkanoic acid esters that can be used are either monoesters or diesters of aliphatic or cycloaliphatic alcohols. Particularly preferred are monoesters of the formula

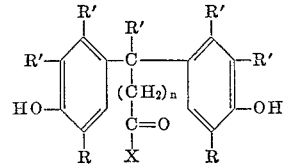

where R is an alkyl radical, R' is hydrogen or an alkyl radical and at least one R' on each phenolic nucleus is hydrogen, X is an alkoxy radical containing 1 to 34 carbon atoms, and n is 0 to 8, and diesters of the formula

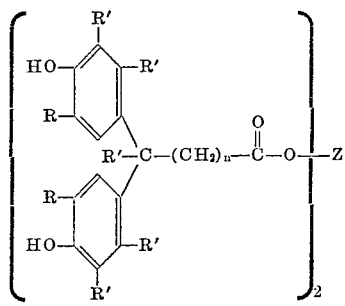

where R is an alkyl radical, R' is hydrogen or an alkyl radical and at least one R' on each phenolic nucleus is hydrogen, Z is the divalent moiety of a diol, and n is 0 to 8. Particularly preferred are the diesters of aliphatic and carbocyclic diols, e.g., diesters of the above formula wherein Z is methylene, propylene, butylene, pentylene, hexylene decamethylene, phenylene, cyclobutylene, 2,2,4,4-tetramethyl-1,3-cyclobutylene, cyclopentylene, cyclohexylene, and the like. Suitable alkyl groups R and R' of either of the above formulas can contain from 1 to 20 carbon atoms, and preferably are tertiary alkyl groups containing from 4 to 9 carbon atoms. The mono- and diesters can be prepared by condensing a phenol with a dichloro or a keto acid in the presence of an acid as catalyst and then esterifying in known manner, as, for example, according to the methods of Yu and Day, J. Org. Chem 23, 1004 (1958), using the desired monohydric or dihydric alcohol, e.g., glycol, 1,4-butane diol, 1,3-cyclobutane diol, and the like. A particularly preferred method for preparing the diesters of cyclic diols comprises reacting the diphenol-substituted acids with excess thionyl chloride in anhydrous medium using, if desired, dimethylformamide to catalyze the reaction and then condensing 2 moles of the so-formed diphenol-substituted acid chloride with 1 mole of the desired cyclic diol using pyridine or other base as catalyst. Inclusive of the bis(alkylhydroxyphenyl)alkanoic acid esters are bis(3,5-di-tert-butyl-4-hydroxyphenyl)pentanoic acid dodecyl ester, decamethylene di[bis(3,5-di-tert-butyl - 4-hydroxyphenyl)]acetate, 2,2,4,4-tetramethyl-1,3-cyclobutyl-di[bis(3,5-di-tert-butyl-4-hydroxyphenyl)]acetate, 2,2,4,4-tetramethyl-1,3-cyclobutyl - di[bis(3-tert-butyl - 6-methyl - 4-hydroxyphenyl]acetate, 2,2,4,4-tetramethyl - 1,3-cyclobutyl-di[bis(3-tert-butyl-6-methyl-4-hydroxyphenyl)]acetate, 2,2,4,4-tetramethyl - 1,3-cyclobutyl-di[bis(3,5-di-tert-butyl-4-hydroxypheny)]proprionate, 2,2,4,4 - tetramethyl - 1,3-cyclobutyl - di[4,4-bis(3-tert-butyl - 4-hydroxyphenyl)]pentanoate, 1,4-cyclohexyl-di[bis(3,5-di-tert-butyl-4-hydroxyphenyl)]acetate, 1,4 - phenyl-di[bis(3,5-di-tert-butyl - 4-hydroxyphenyl)]acetate, and the like.

The second class of phenolic compounds, the poly(alkylhydroxyphenyl) substituted hydrocarbons, are bis(alkylhydroxyphenyl)alkanes, α,ω - bis(alkylhydroxyphenyl)alkanes, bis(alkylhydroxyphenyl)cycloalkanes, tetrakis(alkylhydroxyphenyl)alkanes, bis(alkylhydroxyphenyl) benzenes, bis-, tris-, and tetrakis(alkylhydroxybenzyl) alkyl benzenes, and bis[di(alkylhydroxyphenyl)alkyl]benzenes. Also included in this category are the A-stage p-tert-alkylphenol-formaldehyde resins such as are described in U.S. Patent No. 2,968,641.

The bis(alkyldroxyphenyl)alkanes are alkylidene-bis(alkylphenol)s, characterized by the general formula

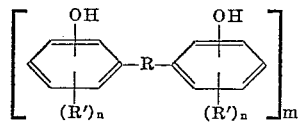

wherein R is an alkylidene radical of 1 to 5 carbon atoms and wherein R' is an alkyl group of 1 to 12 carbon atoms and n is an integar from 1 to 3 and m is an integer from 1 to 2. When more than one R' substitutent is present on a phenyl group, each R' can be the same or different. Exemplary of the alkylidene-bis(alkylphenol)s that may be used are 2,2'-methylene-bis(5-isopropylphenol), 2,2'-methylene-bis(4-methyl-6-isopropylphenol), 2,2'-methylene-bis(4-methyl-6-tert-butylphenol), 2,2'-methylene-bis(4-tert-butyl - 6-methylphenol), 2,2'-methylene-bis(4,6-di-tert-butylphenol), 2,2'-methylene - bis(4-nonylphenol), 2,2'-methylene-bis[4-methyl-6 - (1-methyl - cyclohexyl)phenol], 2,2' - methylene-bis(4-decylphenol), 4,4'-methylene-bis(5-methyl - 2-tert-butylphenol), 4,4'-methylene-bis[5-methyl - 2 - (1-methylcyclohexyl)phenol], 4,4-methylene-bis(2,6 - di-tert-butylphenol), 2,2'-isopropylidene-bis(5-methylphenol), 4,4' - methylene-bis(2 - methyl-6-tert-butylphenol), 2,2'-ethylidene-bis(4 - methyl - 6-tert-butylphenol),2,2' - ethylidene-bis(4,6 - di - tert - butylphenol), 2,2'-ethylidene - bis(4-octylphenol), 2,2'-ethylidene-bis(4 - nonylphenol), 2,2'-isopropylidene - bis(4-methyl-6 - isopropylphenol), 2,2'-isopropylidene - bis(4-isopropylidene - bis(4-decylphenol), 2,2' - n-butylidene-6-methylphenol), 2,2'-isopropylidene - bis(4-methyl - 6-tert - butylphenol), 2,2' - isopropylidene - bis(4-octylphenol), 2,2'-isopropylidene - bis(4-nonylphenol), 2,2'-isopropylidene - bis(4-decylphenol), 2,2ɪ - n-butylidene-bis(4-methyl-6-tert-butylphenol), 2,2'-isobutylidene - bis(4-methyl-6-tert-butyl-phenol), 2,2'-isobutylidene - bis(4-nonylphenol), 4,4'-n-butylidene - bis(2-tert-butyl-5-methylphenol), and the corresponding α,ω - bis(alkylidene)-bis(alkylphenol)s.

Also suitable are the bis(alkylhydroxyphenyl)cycloalkanes, i.e., the cycloalkylidene bis(alkylphenol)s, the tetrakis(alkylhydroxyphenyl)alkanes, the bis(alkylhydroxyphenyl)benzenes, i.e., the benzylidene-bis(alkylphenol)s, the bis-, tris-, or tetrakis(alkylhydroxybenzyl)alkylbenzenes and the bis[di(alkylhydroxyphenyl)alkyl]benzenes. The poly(alkylhydroxyphenyl)alkanes, cycloalkanes, and benzenes are known compounds and can be prepared by condensing at least 2 moles of the phenol with 1 mole of an aldehyde or ketone in a solvent in the presence of an acidic catalyst such as hydrogen chloride or zinc chloride, as, for example, according to the conditions described in Chapter 3 of "The Chemistry of Phenolic Resins" by Robert W. Martin, John Wiley & Sons, Inc. (1956), and British Patent 951,933. The poly(alkylhydroxybenzyl)alkyl benzenes are similarly known compounds and are described in U.S. Patent No. 3,026,264 to Rocklin and Van Winkle. Exemplary of these phenols are 4,4'-cyclohexylidene-bis(2-tert-butylphenol), 4,4'-(4-tert-butylcyclohexylidene)-bis(2-tert-butylphenol), 4,4'-cyclopentylidene - bis (2-tert-butylphenol), 1,1,3,3 - tetrakis(5 - tert-butyl-4-hydroxy-2-methylphenyl)propane, 1,1,4,4-tetrakis(5-tert-butyl-4-hydroxy-2-methylphenyl)butane, 1,1,4,4-tetrakis(2,5-dimethy l- 4 - hydroxyphenyl)butane, 1,1,5,5 - tetrakis(2-methyl-5-tert-butyl-4-hydroxyphenyl)pentane, 1,1,5,5-tetrakis(2,5-dimethyl-4-hydroxyphenyl)pentane, 4,4'-benzylidene-bis(2-tert-butylphenol), 4,4' - (3,5-dimethylbenzylidene)-bis(2-tert-butylphenol), 1,3,5-trimethyl - 2,4,6 - tris(3,5-di-tert-butyl-4-hydroxybenzyl)benzene, 1,2,4-trimethyl - 3,5,6-tris(3-methyl-5-isopropyl-4-hydroxybenzyl)benzene, 1,2,5-triethyl-3,4,6-tris(3,5-diisopropyl - 4 - hydroxybenzyl)benzene, 1,2,4 - tripropyl-3,5,6-tris(3-ethyl-5-tert-butyl-4-hydroxybenzyl)benzene, 1,2,4-trioctyl-3,5,6-tris(3-hexyl-5-tert-amyl-4-hydroxybenzyl)benzene, 1,2 - dimethyl-5-ethyl-3,4,6-tris (3-amyl-5-tert-butyl-4-hydroxybenzyl) benzene, 1 - methyl-2,4-dibutyl-3,5,6-tris(3,5-di-tert-hexyl-4-hydroxybenzyl)benzene, 1,3,5 - trimethyl-2,4,6-tris(3,5-diisopropyl-4-hydroxybenzyl)benzene, 1,3,5-triethyl-2,4,6-tris(3,5-di-tert-amyl-4-hydroxybenzyl)benzene, 1,3,5 - tributyl-2,4,6-tris (3-isopropyl-5-tert-amyl-4-hydroxybenzyl)benzene, 1,3,5-tripropyl - 2,4,6 - tris(3,5-di-tert-octyl-4-hydroxybenzyl)benzene, 1,4-bis[di(5-tert-butyl-4-hydroxy-2-methylphenyl)methyl]benzene, and 1,4-bis[di(2,5-dimethyl-4-hydroxyphenyl)methyl]benzene.

The third class of phenols, the poly(alkylhydroxyphenoxy) substituted triazines, are trisubstituted s-triazines of the formula

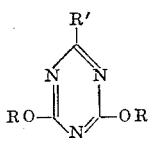

wherein R is alkylhydroxyphenyl and R' is —OR or thioalkyl. Preferably, the alkyl groups in R and R' contain from 1 to 18 carbon atoms, and most preferably from 1 to 10 carbon atoms. When in the above formula R' is OR, the triazines are tris(alkylhydroxyphenoxy)-s-triazines. Typical of compounds of this class are those wherein the alkylhydroxyphenoxy groupings are 3- or 5-methyl-4-hydroxyphenoxy, 3- or 5-ethyl-4-hydroxyphenoxy, 3- or 5-propyl-4-hydroxyphenoxy, 3- or 5-butyl-4-hydroxyphenoxy, 3- or 5-octyl-4-hydroxyphenoxy, 3- or 5-dodecyl-4-hydroxyphenoxy, 3- or 5 - octadecyl-4-hydroxyphenoxy, 3,5 - di - tert-butyl - 4 - hydroxyphenoxy, 3,5-di-tert-octyl-4 - hydroxyphenoxy, 3-tert-butyl-6-methyl-4-hydroxyphenoxy, 6-methyl-3,5-di-tert-butyl - 4 - hydroxyphenoxy, and the like.

As stated above, R' can also be a thioalkyl radical in which case the triazines are bis(alkylhydroxyphenoxy) monothioalkyl-s-triazines. Typical of compounds of this class are those having as the alkylhydroxyphenoxy substituents one of the groupings enumerated above and a thioalkyl substituent containing 1–18 carbon atoms in the alkyl group, and most preferably a thiomethyl, thioethyl, thiopropyl, thiobutyl, thiooctyl, thiododecyl, thiooctadecyl, and the like group. Both the bis(alkylhydroxyphenoxy)monothioalkyl-s-triazines and the tris(alkylhydroxyphenoxy)-s-triazines are known compounds and are described in Belgian Patent No. 602,450.

The fourth class of phenols are alkylphenolacetylene condensates which are polymeric phenols comprising the repeating unit

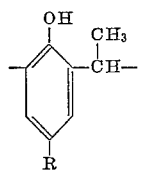

where R is hydrogen or an alkyl radical containing 1 to 20 carbon atoms and preferably is a tertiary alkyl radical containing 4 to 20 carbon atoms. Particularly useful are the condensates of acetylene and p-tert-butylphenol, p-tert-amylphenol, p-tert-heptylphenol, p-tert-nonylphenol, and the like, having molecular weights from about 500 to 1,500. Such condensates are known and can be prepared by methods known to the art, as, for example, according to the methods of Reppe and Keyssner in U.S. Patents Nos. 2,027,199 and 2,072,825 or Zoss, Hanford and Schildknecht, Ind. Eng. Chem., 41, 73 (January 1949).

The fifth class of phenols, the thiobis(alkylphenol)s, are also well-known materials and suitably include such compounds as 2,2'-thiobis(4-methyl-6-tert-butylphenol), 4,4'-thiobis(3-methyl-6-tert-butylphenol), 4,4'-thiobis(5-methyl-2-tert-butylphenol), 4,4'-thiobis(2,6 - di - tert-butylphenol), 4,4'-thiobis(2-methyl-6-isopropylphenol), 4,4'-thiobis(2-ethyl-6-sec-butylphenol), 4,4'-thiobis(2,6 - diisopropylphenol), 4,4'-thiobis(2-methyl-6-tert-butylphenol), 4,4'-thiobis(2 - n - butoxy-6-tert-butylphenol), 4,4' - thiobis(2-methoxy-6-sec-butylphenol), 4,4' - dithiobis(2-n-propyl-6-tert-butylphenol), 4,4'-trithiobis(2-methyl-6-tert-butylphenol), and the like.

The sixth class of phenols, the polymeric terpenephenol condensates, are generally not pure products but complex mixtures of the copolymers of a terpene and a phenol and include, in addition to the condensates per se, the products obtained by subjecting the condensation products to complete or partial hydrogenation and the products obtained by further condensation of the condensation product with either an aldehyde or a ketone followed, if desired, by complete or partial hydrogenation of the resulting further condensation products. Such terpene-phenol condensates are known and are described in British Patent No. 866,891. Particularly preferred are the polymeric condensates prepared by condensing at least 1 mole of a phenol having 1 ortho position open such as phenol, the cresols, the 2,4-dialkylphenols, wherein the alkyl group contains no more than 5 carbon atoms, the p-alkyl-, aralkyl-, and aryl-substituted phenols such as p-ethylphenol, p-isopropylphenol, p-tert-butylphenol, p-tert-octylphenol, p-phenylphenol, p-cyclohexylphenol, and the like with 1 or more than 1 mole of a cyclic terpene hydrocarbon having at least 1 ethylenic double bond in the presence of an acid catalyst. Suitable cyclic terpenes are the monocyclic terpenes such as dipentene, terpinolene, α-terpinene, β-terpinene, gamma terpinene, α- and β-phellandrene, limonene, and the menthadienes, the bicyclic terpenes containing 1 double bond which readily isomerize to terpenes containing 2 double bonds such as α-pinene, β-pinene, the carenes and the thujenes, bicyclic terpenes containing 1 double bond such as camphene, bornylene, and the fenchenes which do not isomerize to monocyclic terpenes containing 2 double bonds, and mixtures of the various cyclic terpenes. Any monocyclic dihydroterpene containing at least 1 ethylenic double bond, as, for example, 1-para-menthene (carvomenthene), 2-para-menthene, 3-paramenthene, 1(7)-para-menthene, 4(8)-para-menthene, 8-para-menthene and the dihydropyronenes can also be used. Conditions and catalysts for carrying out the condensation reaction are known to the art and an excess of either terpene or phenol can be used. It is particularly preferred, however, to use about 0.75 to about 2 moles of phenol for each mole of terpene and to use as the catalyst sulfuric acid, aluminum chloride, or boron trifluoride. Preferably, the temperature of the reaction is maintained at 25° C. or below since under these conditions higher molecular weight materials with higher softening points are more readily obtained.

The components of the stabilizer combination used in accordance with this invention can be mixed with the polyolefin by any of the usual procedures for incorporating a stabilizer in a solid material. A simple method is to dissolve the stabilizer components in a low boiling solvent such as benzene and the like, and, after thoroughly mixing the solution with the polyolefin in flake or other such form, evaporating the solvent; or they can be incorporated by various means of mechanical mixing, etc.

The amount of the phenolic compound and the poly (cyclohexylenedisulfide) incorporated in the polyolefin can be varied independently from a very small stabilizing amount up to several percent. More specifically, beneficial results are normally obtained when equal parts of the phenolic compound and poly(cyclohexylenedisulfide) are employed and the total amount of stabilizer combination is from about 0.02% to about 10% by weight of the polyolefin, and preferably between about 0.2% to about 5% of the polyolefin.

In addition to the phenolic compound and the poly (cyclohexylenedisulfide), there can also be present other stabilizers which improve the color, light, and/or heat stability of the polyolefin. The stabilizer combination of this invention can also be used with ultraviolet light absorbers, antacids such as calcium soaps, organic phosphites, pigments, dyes, fillers, antistatic agents, etc.

The following examples illustrate the degree of stabilization that is obtained when the stabilizer combination of the invention is incorporated in a polyolefin. The term "RSV" as used herein denotes reduced specific viscosity, which is the specific viscosity divided by concentration of a 0.1% weight/volume solution of polymer in decahydronaphthalene at 135° C. All parts and percentages are by weight and percentages are based on the weight of the polymer unless otherwise stated.

EXAMPLE 1

A composition was prepared by blending on a roll mill for 10 minutes at 172° C. 100 parts of stereoregular polypropylene having a birefringent melting point of about 168° C., an RSV of 3.6, and containing 0.1% of calcium stearate as an antacid, with 0.5 part of 2,4,6-tris(3,5-di-tert-butyl-4-hydroxyphenoxy)-1,3,5-triazine and 0.5 part of a poly(dipentenedisulfide) having a molecular weight of about 6660 and prepared by oxidizing 2,9-p-menthane dithiol with a stoichiometric amount of iodine in the presence of less than an equivalent of potassium hydroxide and benzene. The composition was compression molded into 10-mil sheets at a pressure of 1500 p.s.i. using a cycle of 215° C./5 minutes and was then cooled under pressure. The sheets were cut into 3½ x ¾-inch strips and some of the strips were evaluated for stability by exposing in a 140° C. circulating air oven until the first sign of degradation was observed. Other strips were immersed in boiling distilled water for 1 or 3 days, dried, and then were exposed in the 140° C. circulating air oven until the first sign of embrittlement. For the sake of comparison, compositions were also prepared and evaluated as above with the exception that either no 2,4,6-tris(3,5-di-tert-butyl-4-hydroxyphenoxy)-1,3,5-triazine was used (Control A), or no poly(dipentenedisulfide) was used (Control B). Results of the embrittlement tests are tabulated below.

|  | Days' Immersion in Water Prior to Aging | | |
| --- | --- | --- | --- |
|  | 0 | 1 | 3 |
| Embrittlement Time (Days): | | | |
| Example 1 | 123 | 110 | 19 |
| Control A | 84 | 40 | 2 |
| Control B | 23 | 5 | 2 |

EXAMPLES 2–6

The procedure of Example 1 was repeated except that in these examples the 0.5 part 2,4,6-tris(3,5-di-tert-butyl-4-hydroxyphenoxy)-1,3,5-triazine was replaced by 0.5 part of 2,4-bis(3,5-di-tert-butyl-4-hydroxyphenoxy)-6-thiooctyl-1,3,5-triazine (Example 2), 1,3,5-trimethyl-2,4,6 - tris(3,5 - di-tert-butyl-4-hydroxybenzyl)benzene (Example 3), 2,2,4,4-tetramethyl-1,3-cyclobutyl-di[bis(3,5-di-tert-butyl-4-hydroxyphenyl)]acetate (Example 4), the polymeric condensate of p-tert-butylphenol and acetylene having an average molecular weight of 1022 (Example 5), and the product obtained by condensing 1 mole of p-tert-butylphenol with 1 mole of α-pinene in hydrocarbon solvent at below 25° C. in the presence of boron trifluoride catalyst, the product having a molecular weight (rast) of 470, a drop softening point (Hercules Drop Method) of 118° C. and containing 5.2% free hydroxyl groups (Example 6). Embrittlement results for these examples are tabulated below as compared with controls run for each example in the same manner as in Example 1 without the poly(dipentenedisulfide). A control containing only the poly(dipentenedisulfide), i.e., without any phenolic compound, gave an embrittlement time of 23 days without extraction and 5 and 2 days after 1 and 3 days' extraction, respectively.

|  | Days' Immersion in Water Prior to Aging | | |
| --- | --- | --- | --- |
|  | 0 | 1 | 3 |
| Embrittlement Time (Days): | | | |
| Example 2 | 121 | 75 |  |
| Control | 75 | 30 |  |
| Example 3 | 155 | 119 | 93 |
| Control | 120 | 80 | 64 |
| Example 4 | 165 | 110 | 81 |
| Control | 122 | 18 | 7 |
| Example 5 | 59 | 47 | 44 |
| Control | 5 |  |  |
| Example 6 | 71 | 23 | 30 |
| Control | 23 | 2 |  |

EXAMPLES 7–8

The procedure of Example 1 was repeated except that in these examples the poly(dipentenedisulfide) had a molecular weight of 9500 and that in Example 7 the product obtained by reacting 2 moles of n-nonylphenol and 1 mole of acetone under acid conditions [the product comprising a mixture of 2,2'-isopropylidene-bis(4-nonylphenol) and 2'-(2-hydroxyphenyl)-2,4,4-trimethyl-5',6-dinonylchroman] and in Example 8 the A-stage resin produced by heating a mixture of p-tert-octylphenol, formaldehyde and oxalic acid as catalyst under reflux until the condensation product was prepared (in accordance with the procedure of U.S. Patent No. 2,968,641) was substituted for the 2,4,6-tris(3,5-di-tert-butyl-4-hydroxyphenoxy)-1,3,5-triazine of Example 1. Embrittlement results for these examples as compared with controls which did not contain the poly(dipentenedisulfide) are tabulated below.

|  | Days' Immersion in Water Prior to Aging | | |
| --- | --- | --- | --- |
|  | 0 | 1 | 3 |
| Embrittlement Time (Days): | | | |
| Example 7 | 70 |  | 14 |
| Control | 6 |  |  |
| Example 8 | 48 |  | 40 |
| Control | 43 |  | 10 |

EXAMPLES 9–15

The procedure of Example 2 was repeated except that the poly(dipentenedisulfide) was used in these examples had molecular weights ranging from 755 to 15,700. Details as to the compositions of the examples and the results of the embrittlement tests are recorded below in Table I.

TABLE I

| Stabilizer Component | Composition (parts per 100 parts polymer, by weight) | | | | | | |
| --- | --- | --- | --- | --- | --- | --- | --- |
|  | Ex. 9 | Ex. 10 | Ex. 11 | Ex. 12 | Ex. 13 | Ex. 14 | Ex. 15 |
| Poly (dipentene disulfide)¹: | | | | | | | |
| mol. wt. 755 | 0.5 |  |  |  | 0.5 |  |  |
| mol. wt. 9,500 |  | 0.5 |  |  |  | 0.5 |  |
| mol. wt. 15,700 |  |  | 0.5 |  |  |  | 0.5 |
| 2,4-bis(3,5-di-tert,butyl-4-hydroxyphenoxy)-6-thiooctyl-1,3,5-triazine |  |  |  | 0.5 | 0.5 | 0.5 | 0.5 |

| Days' Immersion in Water Prior to Aging | Embrittlement Time (Days) | | | | | | |
| --- | --- | --- | --- | --- | --- | --- | --- |
| 0 | 34 | 7 | 44 | 75 | 127 | 142 | 123 |
| 1 | 3 |  | 1 | 30 | 21 |  | 58 |
| 3 | 1 | 5 | 1 | 25 | 24 | 80 | 10 |

¹ The poly (dipentene disulfides) were prepared by the procedure described in Example 1 except that the material having a mol. wt. of 755 was prepared using ferric chloride instead of iodine.

What we claim and desire to protect by Letters Patent is:

1. A polyolefin containing as a water-resistant stabilizer therefor a small stabilizing amount of the combination of a poly(cyclohexylenedisulfide) of the formula

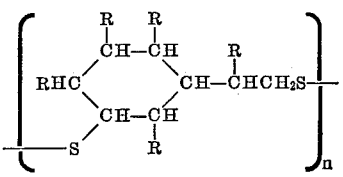

wherein R is selected from the group consisting of hydrogen and an alkyl radical and $n$ is a number from 5 to 100 with a hindered phenolic compound selected from the group consisting of bis(alkylhydroxyphenyl) alkanoic acid esters, poly(alkylhydroxyphenyl) substituted hydrocarbons, poly(alkylhydroxyphenoxy) substituted triazines, polymeric phenols containing the repeating unit

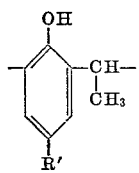

where R' is hydrogen or an alkyl radical containing 1 to 20 carbon atoms, thiobis(alkylphenol)s, and polymeric terpenephenol condensates prepared by condensing in the presence of an acid catalyst at least one mole of a phenol having one ortho position open with one or more moles of a cyclic terpene hydrocarbon having at least one ethylenic double bond.

2. The composition of claim 1 in which the polyolefin is polypropylene.

3. The composition of claim 2 in which the polymeric disulfide is poly(dipentenedisulfide).

References Cited

UNITED STATES PATENTS 3,293,209  12/1966  Baldwin et al. ____ 260—45.95

DONALD E. CZAJA, Primary Examiner.

JAMES A. SEIDLECK, Examiner.

M. J. WELSH, Assistant Examiner.